United States Patent [19]
Klatte

[11] Patent Number: 5,885,543
[45] Date of Patent: Mar. 23, 1999

[54] METHOD FOR PRODUCING CHLORINE DIOXIDE USING CALCIUM CHLORIDE IMPREGNATED ZEOLITE OR AQUEOUS CALCIUM CHLORIDE

[76] Inventor: Fred Klatte, Two Spruce St., San Francisco, Calif. 94118

[21] Appl. No.: 798,873

[22] Filed: Feb. 11, 1997

[51] Int. Cl.$^6$ ..................................................... C01B 11/02
[52] U.S. Cl. .......................... 423/477; 423/245.1; 502/60; 422/4; 422/29; 422/30; 422/37; 210/754
[58] Field of Search ........................ 502/60, 64; 423/477, 423/245.1; 210/754; 422/4, 29, 30, 37

[56] References Cited

U.S. PATENT DOCUMENTS

| | | | |
|---|---|---|---|
| 3,271,242 | 9/1966 | McNicholas | 167/17 |
| 4,247,531 | 1/1981 | Hicks | 423/477 |
| 4,547,381 | 10/1985 | Mason et al. | 426/316 |
| 4,590,057 | 5/1986 | Hicks | 423/477 |
| 4,689,169 | 8/1987 | Mason et al. | 252/186.24 |
| 4,731,193 | 3/1988 | Mason et al. | 252/95 |
| 4,889,654 | 12/1989 | Mason et al. | 252/100 |
| 5,278,112 | 1/1994 | Klatte | 502/62 |
| 5,567,405 | 10/1996 | Klatte et al. | 423/477 |
| 5,573,743 | 11/1996 | Klatte et al. | 423/477 |

FOREIGN PATENT DOCUMENTS 6-285368  10/1994  Japan .

OTHER PUBLICATIONS

Masschelein, *Chlorine Dioxide–Chemistry and Environmental Impact of Oxychlorine Compounds* (1979) (Ann Arbor Science Publishers Inc., Ann Arbor, Michigan), pp. 138–141.

*Primary Examiner*—Michael Lewis
*Assistant Examiner*—Thomas G. Dunn, Jr.
*Attorney, Agent, or Firm*—Limbach & Limbach L.L.P.

[57] ABSTRACT

A method for producing chlorine dioxide by activating zeolite crystals (which have been impregnated with metal chlorite such as sodium chlorite, and a water-retaining substance such as magnesium sulfate, potassium chloride, or potassium hydroxide, or calcium chloride) with an acid, or activating an aqueous solution of metal chlorite (preferably sodium chlorite) and such a water-retaining substance. Acids useful for performing the activation are acetic acid, phosphoric acid, and citric acid. The activation can be performed by causing fluid to flow through a bed of zeolite crystals impregnated with calcium chloride (or another water-retaining substance) and sodium chlorite, and a bed of zeolite crystals impregnated with the acid. The two beds can be physically mixed together, or the fluid can be caused to flow sequentially through distinct first and second beds (preferably first through the bed containing acid-impregnated zeolite). The activation can also be performed by immersing impregnated zeolite crystals in (or spraying them with) acid. To produce chlorine dioxide using the sodium chlorite-containing aqueous solution of the invention, the solution is mixed (or otherwise combined) with acid. Other embodiments of the invention are impregnated zeolite crystals (or other substances), which are useful for producing chlorine dioxide and are stable until activated with acid. The presence (in a sufficient amount) of calcium chloride (or another water-retaining substance) in the unactivated composition reduces the rate of chlorine dioxide outgassing to no more than a negligible amount at times prior to activation of the composition with acid.

56 Claims, 1 Drawing Sheet

METHOD FOR PRODUCING CHLORINE DIOXIDE USING CALCIUM CHLORIDE IMPREGNATED ZEOLITE OR AQUEOUS CALCIUM CHLORIDE

FIELD OF THE INVENTION

The invention relates to methods for producing chlorine dioxide, and to substances used in performing such methods. Each method produces chlorine dioxide by activating zeolite crystals (previously impregnated with a mixture of sodium chlorite and a water-retaining substance such as calcium chloride) with an acid, or by activating an aqueous solution of a water-retaining substance (such as calcium chloride) and sodium chlorite with an acid.

BACKGROUND OF THE INVENTION

Zeolites are hydrated metal aluminosilicate compounds with well-defined (tetrahedral) crystalline structures. Because zeolite crystals (both natural and synthetic) have a porous structure with connected channels extending through them, they have been employed as molecular sieves for selectively absorbing molecules on the basis of size, shape, and polarity.

Volumes packed with zeolite crystals (for example, small zeolite crystals chosen to have size in the range from 0.2 mm to one quarter inch) have been employed in air (or other gas) and water filtration systems to selectively absorb contaminants from a flowing stream of water or gas.

U.S. Pat. No. 5,567,405, issued Oct. 22, 1996 (based on U.S. application Ser. No. 08/445,025, filed May 19, 1995), and U.S. Pat. No. 5,573,743, issued Nov. 12, 1996 (based on U.S. application Ser. No. 08/445,076), teach methods for producing zeolite crystals impregnated with one or more of sodium chlorite, acetic acid, phosphoric acid, and citric acid, and methods for producing chlorine dioxide by moving a fluid (e.g., air or water) relative to a bed of zeolite crystals impregnated with sodium chlorite, and moving the fluid relative to another bed of zeolite crystals impregnated with one of the following: phosphoric acid, acetic acid and citric acid. The two beds can be physically mixed together, or the fluid can flow sequentially through distinct first and second beds. These references also teach a method for filtering a fluid by producing chlorine dioxide in the fluid (in the manner described in this paragraph) and then absorbing the chlorine dioxide from the fluid.

U.S. patent application Ser. No. 08/704,086, filed Aug. 28, 1996, now U.S. Pat. No. 5,730,948, teaches a variation on the chlorine dioxide production method of U.S. Pat. No. 5,567,405, which includes the steps of moving a fluid through a first bed of impregnated zeolite crystals (impregnated with at least one of phosphoric acid, acetic acid, and citric acid) and then moving the fluid through a second bed of impregnated zeolite crystals (impregnated with sodium chlorite).

Chlorine dioxide ($ClO_2$) is useful for killing biological contaminants (such as microorganisms, mold, fungi, yeast and bacteria) and for oxidizing volatile organic chemicals which can contaminate fluid.

It is known to produce chlorine dioxide by: activating a metal chlorite solution by adding an acid thereto, activating a powdered composition (or other dry composition) by adding water thereto, or preparing an activated dry composition which releases chlorine dioxide over time. U.S. Pat. No. 4,547,381 (issued Oct. 15, 1985) and U.S. Pat. No. 4,689,169 (issued Aug. 25, 1987) mention these three techniques for producing chlorine dioxide, and disclose in some detail one type of such an activated dry composition. They teach that this activated dry composition is a mixture of a "dry inert diluent," a metal chlorite, and a dry agent capable of reacting with the metal chlorite in a dry state to produce chlorine dioxide. The metal chlorite can be sodium chlorite, and the dry agent can be a "dry acid" such as granular citric acid. The inert diluent can be diatomaceous earth, sodium chloride, sodium silicate, disodium sulfate, or magnesium chloride, or a combination of two or more thereof. The mixture releases chlorine dioxide over time until the rate of chlorine dioxide release becomes low, and the patents teach that the mixture can then be agitated for "renewed generation" of chlorine dioxide.

However, an activated composition (such as that described in U.S. Pat. Nos. 4,547,381 and 4,689,169) is subject to undesirable storage and shipping losses, due to outgassing of chlorine dioxide before the time of intended use of the composition.

Similarly, the inventor has found that sodium chlorite-impregnated zeolite crystals (of the type described in referenced U.S. Pat. Nos. 5,567,405 and 5,573,743) are also subject to undesirable storage and shipping losses, due to outgassing of chlorine dioxide therefrom before the time of their intended use (e.g., before fluid is caused to flow through both a bed of the sodium chlorite-impregnated zeolite crystals and a bed of acid-impregnated zeolite crystals). Also, efforts to activate sodium chlorite-impregnated zeolite crystals (of the type described in referenced U.S. Pat. Nos. 5,567,405 and 5,573,743) with acid at low temperature (below 40 degrees Farenheit) may fail in the sense that they will not result in release of sufficient amounts of chlorine dioxide.

There are also disadvantages to use of conventional metal chlorite solutions (of the type mentioned in U.S. Pat. Nos. 4,547,381 and 4,689,169) to produce chlorine dioxide. For example, when such a conventional solution is activated (by adding an acid thereto) to release chlorine dioxide gas, it is difficult or impossible to control the rate of release of the chlorine dioxide gas. Overproduction of chlorine dioxide often results.

There are also disadvantages to use of conventional powdered or dry compositions of the type activated by adding water thereto to release chlorine dioxide (as mentioned, for example, in U.S. Pat. Nos. 4,547,381 and 4,689,169). Masschelein, in the book *Chlorine Dioxide—Chemistry and Environmental Impact of Oxychlorine Compounds* (published 1979 by Ann Arbor Science Publishers Inc., Ann Arbor, Mich.) at page 140, describes one such dry mixture comprising sodium chlorite, and a solid organic anhydride containing 2 to 20% of a dessicating product such as calcium chloride. When such a conventional dry composition is activated (by adding water thereto) to release chlorine dioxide gas, it is typically difficult or impossible to control the rate of release of the chlorine dioxide to achieve chlorine dioxide release rates useful for such applications as air or water filtration. Overproduction of chlorine dioxide often results.

Until the present invention, it was not known how to produce a stable, unactivated substance (either in liquid or dry form) which does not release significant amounts of chlorine dioxide until activated by exposure to an acid, and which releases chlorine dioxide at a useful (and controllable) rate when exposed to an acid (even at temperatures below 40 degrees Farenheit). Nor had it been known to use such a stable, unactivated substance to produce controlled release of chlorine dioxide for filtering air or water.

SUMMARY OF THE INVENTION

In some embodiments, the invention is a method for producing chlorine dioxide by activating zeolite crystals (previously impregnated with sodium chlorite and calcium chloride) with an acid, or activating an aqueous solution of sodium chlorite and calcium chloride with an acid. Examples of acids useful for such activation are acetic acid, phosphoric acid, and citric acid. In accordance with the invention, the activation step can be performed by causing a fluid (e.g., air, another oxygen-containing fluid, or water) to flow through a bed of zeolite crystals impregnated with sodium chlorite and calcium chloride, and a bed of zeolite crystals impregnated with the acid. The two beds can be physically mixed together, or the fluid can be caused to flow sequentially through distinct first and second beds (preferably first through the bed containing acid-impregnated zeolite, but alternatively first through the bed containing sodium chlorite and calcium chloride-impregnated zeolite). Alternatively, chlorine dioxide is produced using sodium chlorite and calcium chloride-impregnated zeolite crystals by immersing the impregnated zeolite in acid, spraying the impregnated zeolite with acid, or otherwise exposing the impregnated zeolite to acid (preferably, aqueous acetic acid, phosphoric acid, or citric acid with a concentration of 0.025% to 0.5%, in the sense that the acid comprises 0.025% to 0.5% by weight of the combined impregnated zeolite and acid).

To produce chlorine dioxide using the inventive aqueous solution of sodium chlorite and calcium chloride, the solution can be mixed (or otherwise combined) with acid. The liquid mixture can then be sprayed or coated on a surface (or the liquid mixture can be absorbed in a material such as a sponge, pad, mat, or the like, or simply placed in a reservoir, container, box, or the like) from which chlorine dioxide gas can escape at a desired rate.

In any of the embodiments, the rate of chlorine dioxide release (following activation) can be controlled in any of several ways, including by appropriately selecting the concentration and amount of the activating acid, or using impregnated zeolite having appropriately selected weight ratios of sodium chlorite to zeolite and calcium chloride to zeolite.

Other embodiments of the invention are substances useful for producing chlorine dioxide, which are stable until activated with acid (in the sense that they do not release chlorine dioxide gas in significant amounts until activated with acid). One such embodiment is one or more zeolite crystals impregnated with sodium chlorite and calcium chloride. Preferably, the zeolite crystals are small (each of size in a range from 0.2 mm to one quarter inch). Also preferably, the crystals comprise 1%–6% sodium chlorite, 0.5%–2% calcium chloride, 4%–8% water, and 84%–94.5% zeolite (by weight). Another such embodiment is an aqueous solution of sodium chlorite and at least one chemical selected from the group consisting of magnesium sulfate, potassium chloride, potassium hydroxide, and calcium chloride, preferably comprising 1%–6% of sodium chlorite, 0.5%–2% of said at least one chemical, and 92%–98.5% of water (by weight). Preferably, the solution comprises 1%–6% sodium chlorite, 0.5%–2% calcium chloride, and 92%–98.5% water (by weight).

In variations on any embodiment of the invention, a water-retaining substance other than calcium chloride, such as magnesium sulfate ($MgSO_4$), potassium chloride, or potassium hydroxide, is substituted for calcium chloride. For example, zeolite crystals impregnated with sodium chlorite and magnesium sulfate are within the scope of the invention. For another example, a method of producing chlorine dioxide by activating an aqueous solution of sodium chlorite and magnesium sulfate with an acid is also within the scope of the invention.

In other variations on any embodiment of the invention, a metal chlorite other than sodium chlorite is substituted for sodium chlorite. For example, zeolite crystals impregnated with calcium chloride (or magnesium sulfate) and a metal chlorite other than sodium chlorite are within the scope of the invention.

The inventor has found that the presence (in a sufficient amount) of calcium chloride (or another water-retaining substance such as magnesium sulfate, potassium chloride, or potassium hydroxide) in the unactivated composition of the invention reduces the rate of chlorine dioxide outgassing to no more than a negligible amount at times prior to activation of the composition with acid, and yet allows release of chlorine dioxide at a desired rate following activation of the composition with acid. One of the reasons for chlorine dioxide outgassing (prior to activation with acid) from zeolite impregnated with metal chlorite (but not impregnated with a water-retaining substance such as calcium chloride) is migration of H+ ions in the aluminosilicates comprising the zeolite.

DETAILED DESCRIPTION OF THE PREFERRED EMBODIMENTS

Figure 1:
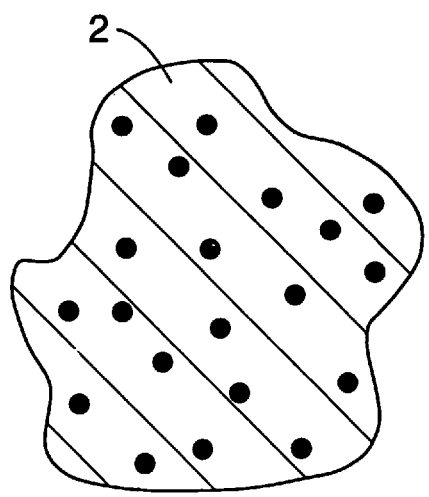
FIG. 1 is a cross-sectional view of a zeolite crystal impregnated with a metal chlorite, and one of calcium chloride, magnesium sulfate, potassium chloride, and potassium hydroxide.
Figure 2:
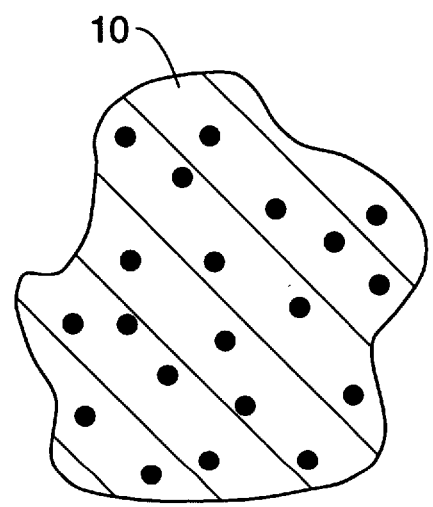
FIG. 2 is a cross-sectional view of a zeolite crystal impregnated with one of the following impregnating agents: phosphoric acid, acetic acid, and citric acid.

In one class of embodiments, the invention is a process for impregnating zeolite crystals with sodium chlorite and calcium chloride, and the product of such process. The zeolite crystals can have size (i.e., largest dimension) equal (or approximately equal) to 0.125 inch, 0.25 inch, 0.50 inch, or 0.75 inch, or size in the range from 0.2 mm to several millimeters, or size in the range from 0.2 mm to 0.25 inch, or the zeolite crystals can have dimensions equal or substantially equal to 0.25 inch×0.167 inch, 0.125 inch×0.10 inch, 0.25 inch×0.125 inch, 0.125 inch×0.50 inch, or 0.50 inch×0.75 inch. The impregnation process produces zeolite crystals uniformly impregnated (throughout the volume of each crystal) with sodium chlorite and calcium chloride.

Preferred embodiments of this impregnation process employ, as input material, zeolite crystals whose moisture content has been reduced (substantially below an initial moisture content) to a low level (preferably about 5%). Such input material is preferably produced by mining zeolite, crushing the mined mineral into appropriately sized zeolite crystals (having a natural moisture content substantially above 5%), and then dehydrating the zeolite crystals until their moisture content is reduced to about 5%.

The dehydrated zeolite crystals are then immersed in (or sprayed with) an aqueous solution of sodium chlorite and calcium chloride at high temperature (e.g., in the range from 120° F. to 190° F.), and the resulting slurry is thoroughly mixed. Then, the mixed slurry is air dried (or allowed to equilibrate to the desired moisture level) to produce impregnated zeolite crystals. Alternatively, the air drying step can be avoided by calculating the amount of aqueous impregnating material needed to achieve the desired final moisture level (e.g., 15%) and adding this amount to the dehydrated zeolite at the time of impregnation.

Alternatively, the dehydrated zeolite crystals are immersed in (or sprayed with) an aqueous solution of sodium chlorite at high temperature (e.g., at least 190° F.), and the resulting slurry is thoroughly mixed. Then, the mixed slurry is air dried (or allowed to equilibrate to the desired moisture level) to produce sodium chlorite-impregnated zeolite crystals. Alternatively, one calculates the amount of aqueous sodium chlorite needed to achieve the desired moisture level (e.g., a desired level in the range 15%–20%) and adds this amount to the dehydrated zeolite at the time of impregnation. Then, the sodium chlorite-impregnated zeolite crystals are immersed in (or sprayed with) an aqueous solution of calcium chloride at high temperature, and the resulting slurry is thoroughly mixed. Then, the mixed slurry is air dried (or allowed to equilibrate to the desired final moisture level) to produce zeolite crystals impregnated with both sodium chlorite and calcium chloride. Alternatively, air drying is avoided by calculating the amount of aqueous calcium chloride needed to achieve the desired final moisture level (e.g., a desired level in the range 15%–20%) and adding this amount to the sodium chlorite-impregnated zeolite at the time of calcium chloride impregnation.

In variations of any of the described zeolite impregnation processes, a water-retaining substance such as magnesium sulfate ($MgSO_4$), potassium chloride, or potassium hydroxide is substituted for calcium chloride as an impregnating agent.

In other variations on the described zeolite impregnation processes, a metal chlorite other than sodium chlorite is substituted for sodium chlorite.

FIG. 1 represents one impregnated zeolite crystal, having channels uniformly impregnated with mixture 2 of metal chlorite and a water-retaining substance. The water-retaining substance is preferably calcium chloride, but alternatively is magnesium sulfate, potassium chloride, potassium hydroxide, or another water-retaining substance. The metal chlorite is preferably sodium chlorite.

The rate at which impregnated zeolite crystals of the type shown in FIG. 1 (e.g., zeolite crystals uniformly impregnated sodium chlorite and calcium chloride) react with acid to release chlorine dioxide can be controlled (reduced or increased to a desired level) by varying the relative amounts (by weight) of the different impregnating agents therein.

Some embodiments of the invention use zeolite crystals impregnated with one or more acids (preferably one or more of acetic acid, citric acid, and phosphoric acid). Above-referenced U.S. Pat. Nos. 5,567,405 and 5,573,743 disclose methods for producing such acid-impregnated zeolite crystals. Briefly, the acid impregnation step is preferably performed by immersing dehydrated zeolite crystals in (or spraying zeolite crystals with) an aqueous solution of one or more of the acids at high temperature, thoroughly mixing the resulting slurry, and finally air drying (or allowing to equilibrate to the desired moisture level, e.g. 15%–20%) the mixed slurry to produce the acid-impregnated zeolite crystals. FIG. 3 represents one such impregnated crystal, having channels uniformly impregnated (throughout the volume of the crystal) with chemical 10, where chemical 10 is acetic acid, citric acid, or phosphoric acid, or a mixture of two or more of such acids.

In general, the acid or acids employed (for activation) in accordance with the invention can be impregnated in zeolite crystals, mixed in an aqueous solution (including a metal chlorite and a water-retaining substance such as calcium chloride), or added to (e.g., sprayed on) zeolite crystals that have been impregnated with a metal chlorite and a water-retaining substance such as calcium chloride.

With reference again to zeolite crystals that have been impregnated in accordance with the invention with sodium chlorite and calcium chloride, such crystals are preferably small (each of size in a range from 0.2 mm to one quarter inch), and each crystal preferably comprises 1%–6% sodium chlorite, 0.5%–2% calcium chloride, 4%–8% water, and 84%–94.5% zeolite (by weight). The inventor has found that the presence of calcium chloride (preferably in the preferred amount noted above) in the unactivated impregnated zeolite reduces the rate of chlorine dioxide outgassing to no more than a negligible amount until activation of the composition with acid, and yet allows release of chlorine dioxide at a desired rate following activation of the composition with acid. This finding was unexpected, since mixing of sodium chlorite and calcium chloride with water would have been expected to produce chlorine dioxide as a result of the following sequence of reactions:

1. 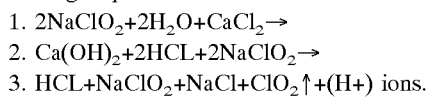
2. $Ca(OH)_2 + 2HCL + 2NaClO_2 \rightarrow$
3. $HCL + NaClO_2 + NaCl + ClO_2\uparrow + (H+)$ ions.

Instead, the unexpected finding that the rate of chlorine dioxide outgassing is substantially reduced is believed to result from the following reaction:

1. 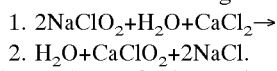
2. $H_2O + CaClO_2 + 2NaCl$.

The products of this reaction, when activated with excess (H+) ions (by exposure to acid) are converted to $ClO_2\uparrow$ and other substances including (H+) ions.

In another class of embodiments, the invention is an aqueous solution of sodium chlorite and calcium chloride (or sodium chlorite and a water-retaining substance other than calcium chloride). This solution can be activated by being reacted with acid (preferably acetic acid, phosphoric acid, or citric acid), to release chlorine dioxide in a controlled manner. Preferably, the solution comprises 1%–6% sodium chlorite, 0.5%–2% calcium chloride, and 92%–98.5% water (by weight). Also preferably, the solution is activated by being mixed (or otherwise combined) with aqueous acetic acid, phosphoric acid, or citric acid having a concentration of 0.025% to 0.5% (by weight of the total mixture). An example of such an aqueous acid is produced by adding 1% (by weight of the total mixture) of a 3% aqueous acetic acid solution. The activated liquid mixture (of aqueous sodium chlorite, calcium chloride, and acid) can then be sprayed or coated on a surface (or the liquid mixture can be absorbed in a material such as a sponge, pad, mat, or the like, or simply placed in a reservoir) from which chlorine dioxide gas can escape at a desired rate.

The inventor has found that the presence of diluted calcium chloride or one of the alternative water-retaining substances (preferably in the above-noted preferred amount of 0.5%–2% by weight) in the unactivated solution reduces the rate of chlorine dioxide outgassing to no more than a negligible amount at times prior to activation with an acid, and yet allows release of chlorine dioxide at a desired rate upon activation of the solution with acid. The unexpected finding that the rate of chlorine dioxide outgassing (prior to activation) is substantially reduced is believed to result from the following reaction in the unactivated solution:

1. $2NaClO_2 + H_2O + CaCl_2 \rightarrow$
2. $H_2O + CaClO_2 + 2NaCl$.

The products of this reaction, when activated with excess (H+) ions (by addition of acid) are converted to $ClO_2\uparrow$ and other substances including (H+) ions.

The impregnated zeolite crystals of the invention (crystals impregnated with a metal chlorite and calcium chloride, or a metal chlorite and a water-retaining substance other than calcium chloride) are useful in a class of methods for producing chlorine dioxide ($ClO_2$). Such methods will be described in preferred embodiments in which calcium chloride is an impregnating agent and the metal chlorite is sodium chlorite, but it should be understood that a water-retaining substance (such as magnesium sulfate, potassium chloride, or potassium hydroxide) can be substituted for calcium chloride as an impregnating agent in the methods (and that a metal chlorite other than sodium chlorite can be substituted for sodium chlorite).

In one chlorine dioxide-producing method in accordance with the invention, a fluid (preferably a fluid containing oxygen, such as air) is caused to move relative to a first bed (i.e., the fluid flows through the first bed or the crystals comprising the first bed move through the fluid) of zeolite crystals impregnated with: (1) phosphoric acid ($H_3PO_4$), (2) acetic acid ($CH_3COOH$), (3) citric acid, or (4) another acid suitable for the particular application. Then, the fluid is caused to move relative to a second bed (i.e., the fluid flows through the second bed, or the crystals comprising the second bed move through the fluid) of zeolite crystals which are impregnated with a mixture of sodium chlorite ($NaClO_2$) and calcium chloride ($CaCl_2$). Upon moving the fluid relative to the second bed, chlorine dioxide is released (due to contact with acid transferred from the first bed). It is believed that the chlorine dioxide release occurs as a result of the following reaction, in the case of a first bed impregnated with acetic acid:

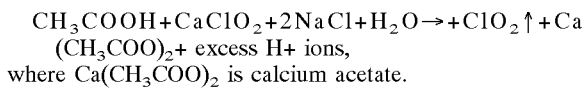
$CH_3COOH + CaClO_2 + 2NaCl + H_2O \rightarrow + ClO_2\uparrow + Ca(CH_3COO)_2 +$ excess H+ ions, where $Ca(CH_3COO)_2$ is calcium acetate.

As discussed above, $CaClO_2$, $2NaCl$, and $H_2O$ are believed to be present in the channels of the zeolite crystals of the first bed as a result of reaction of the impregnating agents $NaClO_2$ and $CaCl_2$, and $H_2O$, in the channels of the zeolite crystals of the first bed.

In variations on this chlorine dioxide production method, the first bed can include a mixture of phosphoric acid-impregnated zeolite crystals and acetic acid-impregnated zeolite crystals, or a mixture of phosphoric acid-impregnated zeolite crystals and citric acid-impregnated zeolite crystals, or a mixture of acetic acid-impregnated zeolite crystals and citric acid-impregnated zeolite crystals, or a mixture of all three types of acid-impregnated zeolite crystals, or a mixture of zeolite crystals impregnated with one of these three types of acids and zeolite crystals impregnated with another acid.

It is preferable for the fluid to flow through a first bed of acid-impregnated zeolite crystals before the fluid flows through a second bed containing sodium chlorite and calcium chloride-impregnated zeolite crystals, since this sequence will result in hydrogen ions (H+ ions) entering the fluid (due to interaction of the fluid with the acid in the crystals of the first bed), and since the presence of the hydrogen ions in the fluid will enhance chlorine dioxide production when the hydrogen ion-containing fluid interacts with the impregnating chemical in the crystals of the second bed.

While the foregoing process for producing $ClO_2$ has been described with reference to two distinct (first and second) beds of impregnated zeolite crystals, a single bed containing a mixture of crystals can be used as long as the mixed bed contains both impregnated zeolite crystals from the first bed described above and zeolite crystals from the second bed described above. As an example, a mixed bed of zeolite crystals (zeolite crystals impregnated with sodium chlorite and calcium chloride mixed with zeolite crystals impregnated with phosphoric acid) can be used to produce chlorine dioxide (e.g., by flowing a fluid through the mixed bed).

Alternatively, chlorine dioxide can be produced by adding aqueous acid to a bed of zeolite crystals impregnated with a metal chlorite (e.g., sodium chlorite) and a water-retaining substance (e.g., calcium chloride). In these alternative embodiments, the rate of release of chlorine dioxide can be controlled by varying the amount and concentration of the added acid.

In alternative embodiments, chlorine dioxide is produced with a reversed sequence of distinct first and second beds, as follows. A fluid (preferably a fluid containing oxygen such as air) is caused to move relative to a first bed (i.e., the fluid flows through the first bed, or the crystals comprising the first bed move through the fluid). The first bed comprises zeolite crystals impregnated with sodium chlorite ($NaClO_2$) and calcium chloride ($CaCl_2$). Then, the fluid is caused to move relative to a second bed (i.e., the fluid flows through the second bed, or the crystals comprising the second bed move through the fluid) of zeolite crystals which are impregnated with: (1) phosphoric acid, (2) acetic acid, (3) citric acid, or (4) another acid suitable for the particular application. Upon moving the fluid relative to the second bed, chlorine dioxide is released. As with other embodiments described herein, a water-retaining substance such as magnesium sulfate, potassium chloride, or potassium hydroxide can be substituted for the calcium chloride (and a metal chlorite other than sodium chlorite can be substituted for the sodium chlorite).

In another class of embodiments of the inventive chlorine dioxide production method, zeolite crystals impregnated with sodium chlorite and calcium chloride are activated by being immersed in (or sprayed with) aqueous acetic acid, phosphoric acid, or citric acid with a concentration of 0.025% to 0.5% (in the sense that the acid comprises 0.025% to 0.5% by weight of the combined impregnated zeolite and acid). Alternatively, another acid suitable for the particular application can be used to immerse (or spray) the impregnated zeolite crystals as a substitute for the aqueous acetic acid, phosphoric acid, or citric acid.

While chlorine dioxide can kill microorganisms in the fluid undergoing treatment, and can oxidize volatile organic chemicals which contaminate the fluid undergoing treatment (as described above), chlorine dioxide itself is a contaminant. Therefore, it is sometimes desirable to remove chlorine dioxide from the fluid stream after the chlorine dioxide has performed purification (including biological purification) of the fluid stream. Another aspect of the present invention relates to a multi-step filtration process in which chlorine dioxide is first produced in a fluid stream and, subsequently, removed from the fluid stream.

First, a fluid is caused to be moved relative to a primary bed (or primary beds) of zeolite crystals (i.e., the described first and second beds, or the described mixed bed) which will cause chlorine dioxide to be released, as described above. While the fluid moves relative to (e.g., while the fluid flows through) the primary bed or beds, chlorine dioxide is released (generally as a gas). The released chlorine dioxide will kill biological contaminants in the fluid and will oxidize volatile organic chemicals which contaminate the fluid.

Then, the fluid is moved relative to a secondary bed (filter) of zeolite crystals impregnated with one of the following: (1) potassium hydroxide (KOH), (2) sodium sulfite, (3) sodium bisulfite, and (4) ferrous sulfate (i.e., the fluid flows through the secondary bed or the crystals comprising the secondary bed move through the fluid). The zeolite crystals of the secondary bed react with the chlorine dioxide to remove the chlorine dioxide from the fluid. Some chemical equations describing possible reactions in the secondary bed follow.

For a secondary bed of potassium hydroxide:

$2KOH + 2ClO_2 \rightarrow KClO_2 + KClO_4 + H_2O$

For a secondary bed of sodium sulfite:

$ClO_2 + Na_2SO_3 \rightarrow H_2O + S_2O_5 + H^+{}_3ClO_3$

Note that $H^{++}$ from the acids involved in the previous reactions cancel this reaction.

For a secondary bed of sodium bisulfite:

$ClO_2 + Na_2SO_5 \rightarrow H_2O + S_2O^5 + H^+{}_3ClO_3$

Note that $H^{++}$ from the acids involved in the previous reactions cancel this reaction.

The preferred composition of the secondary bed is ferrous sulfate. For a secondary bed of ferrous sulfate:

$ClO_2 + Fe^{++}SO_4 \longrightarrow$ $Fe^{+++} + Cl^- + ClO_2^- \longrightarrow FeCl_3 \text{ (primarily)}.$ When using a secondary bed of ferrous sulfate a color change, from white to brown, takes place. This is an indicator of neutralization.

Various modifications and variations of the described methods and compositions of the invention will be apparent to those skilled in the art without departing from the scope and spirit of the invention. For example, a carrier other than zeolite crystals or water (e.g., pumice, diatomaceous earth, bentonite, or clay) can be used to carry the metal chlorite and water-retaining substance (and optionally also the acid) of the invention.

Although the invention has been described in connection with specific preferred embodiments, it should be understood that the invention as claimed should not be unduly limited to such specific embodiments.

What is claimed is:

1. A zeolite crystal, impregnated so as to be capable of releasing chlorine dioxide upon activation by acid, said zeolite crystal being impregnated with:
   a metal chlorite; and
   at least one impregnating agent selected from the group consisting of calcium chloride, magnesium sulfate, potassium chloride, and potassium hydroxide in an amount effective to reduce the rate of chlorine dioxide outgassing prior to acid activation.

2. A crystal according to claim 1 having a size in a range from 0.2 mm to 0.25 inch.

3. A crystal according to claim 1 having a size sufficient for filtration of a fluid.

4. A crystal according to claim 1, wherein the metal chlorite is sodium chlorite.

5. A crystal according to claim 4, wherein the impregnating agent is calcium chloride.

6. A crystal according to claim 5, comprising 1%–6% sodium chlorite, 0.5%–2% calcium chloride, 4%–8% water, and 84%–94.5% zeolite by weight.

7. A method for chemically impregnating zeolite crystals, including the steps of:

(a) dehydrating the zeolite crystals to decrease their moisture content below their initial moisture content; and (b) after step (a), adding to the dehydrated zeolite crystals an aqueous solution of a metal chlorite and at least one impregnating agent selected from the group consisting of calcium chloride, magnesium sulfate, potassium chloride, and potassium hydroxide in an amount effective to reduce the rate of chlorine dioxide outgassing prior to acid activation.

8. The method of claim 7, wherein the metal chlorite is sodium chlorite.

9. The method of claim 8, wherein the impregnating agent is calcium chloride.

10. The method of claim 7, also including the step of:

(c) after step (b), drying the zeolite crystals to produce impregnated zeolite crystals.

11. The method of claim 10, wherein the impregnated zeolite crystals produced during step (c) comprise 1%–6% sodium chlorite, 0.5%–2% calcium chloride, 4%–8% water, and 84%–94.5% zeolite by weight.

12. The method of claim 7, also including the step of:

(c) after step (b), allowing the zeolite crystals to equilibrate to a desired moisture level to produce impregnated zeolite crystals.

13. The method of claim 12, wherein the impregnated zeolite crystals produced during step (c) comprise 1%–6% sodium chlorite, 0.5%–2% calcium chloride, 4%–8% water, and 84%–94.5% zeolite by weight.

14. A zeolite crystal, impregnated with said metal chlorite and said at least one impregnating agent, produced as a result of the method of claim 7.

15. A method for chemically impregnating zeolite crystals, said method including the steps of:

(a) dehydrating the zeolite crystals to decrease their moisture content below their initial moisture content;

(b) after step (a), adding to the zeolite crystals an aqueous solution of a metal chlorite; and (c) after step (b), adding to the zeolite crystals an aqueous solution of at least one impregnating agent selected from the group consisting of calcium chloride, magnesium sulfate, potassium chloride, and potassium hydroxide in an amount effective to reduce the rate of chlorine dioxide outgassing prior to acid activation.

16. The method of claim 15, wherein the metal chlorite is sodium chlorite.

17. The method of claim 16, wherein the impregnating agent is calcium chloride.

18. The method of claim 17, wherein the impregnated zeolite crystals produced during step (c) comprise 1%–6% sodium chlorite, 0.5%–2% calcium chloride, 4%–8% water, and 84%–94.5% zeolite by weight.

19. The method of claim 15, also including the steps of:

(d) after step (b) and before step (c), drying the zeolite crystals to produce metal chlorite-impregnated zeolite crystals that are impregnated with the metal chlorite; and (e) after step (c), drying the metal chlorite-impregnated zeolite crystals to produce impregnated zeolite crystals.

20. The method of claim 15, also including the steps of:

(d) after step (b) and before step (c), allowing the zeolite crystals to equilibrate to a desired moisture level to produce metal chlorite-impregnated zeolite crystals that are impregnated with the metal chlorite; and (e) after step (c), allowing the metal chlorite-impregnated zeolite crystals to equilibrate to a desired moisture level to produce impregnated zeolite crystals.

21. A zeolite crystal, impregnated with said metal chlorite and said at least one impregnating agent, produced as a result of the method of claim 15.

22. A method for filtering a fluid containing a contaminant, including the steps of:
(a) moving the fluid through a first bed of impregnated zeolite crystals which have been impregnated with at least one acidic impregnating agent; and
(b) after step (a), moving the fluid through a second bed of impregnated zeolite crystals which have been impregnated with a metal chlorite and at least one impregnating agent selected from the group consisting of calcium chloride, magnesium sulfate, potassium chloride, and potassium hydroxide, wherein chlorine dioxide is produced as a result of chemical reaction of at least a portion of the second bed with said at least one acidic impregnating agent and at least a portion of said contaminant is removed from said fluid.

23. The method of claim 22, wherein the metal chlorite is sodium chlorite.

24. The method of claim 22, wherein the second bed consists essentially of zeolite crystals impregnated with sodium chlorite and calcium chloride.

25. The method of claim 22, wherein the second bed consists essentially of impregnated zeolite crystals comprising 1%–6% sodium chlorite, 0.5%–2% calcium chloride, 4%–8% water, and 84%–94.5% zeolite by weight.

26. The method of claim 22, wherein the fluid is air.

27. The method of claim 22, wherein the fluid includes microorganisms, and wherein the chlorine dioxide produced in step (b) kills at least some of said microorganisms.

28. The method of claim 22, wherein the fluid is contaminated with volatile organic chemicals, and wherein the chlorine dioxide produced in step (b) oxidizes at least some of the volatile organic chemicals.

29. The method of claim 22, wherein said at least one acidic impregnating agent is at least one acid selected from the group consisting of phosphoric acid, acetic acid, and citric acid.

30. The method of claim 22, also including the step of:
(c) after step (b), moving the fluid relative to is a third bed of impregnated zeolite crystals, wherein the impregnated zeolite crystals in the third bed are impregnated with an impregnating agent selected from the group consisting of potassium hydroxide, sodium sulfite, sodium bisulfite, and ferrous sulfate, and at least some of the chlorine dioxide is removed by chemical reaction with the third bed.

31. A method for producing chlorine dioxide, including the steps of:
(a) moving a first set of impregnated zeolite crystals through a fluid wherein the impregnated zeolite crystals have been impregnated with at least one acidic impregnating agent; and
(b) after step (a), moving a second set of impregnated zeolite crystals through the fluid, wherein the impregnated zeolite crystals in the second set have been impregnated with a metal chlorite and at least one impregnating agent selected from the group consisting of calcium chloride, magnesium sulfate, potassium chloride, and potassium hydroxide, wherein chlorine dioxide is produced as a result of chemical reaction of the second set of impregnated zeolite crystals with at least a portion of said at least one acidic impregnating agent.

32. The method of claim 31, wherein the metal chlorite is sodium chlorite.

33. The method of claim 31, wherein the second set of impregnated zeolite crystals consists essentially of zeolite crystals impregnated with sodium chlorite and calcium chloride.

34. The method of claim 31, wherein said at least one acidic impregnating agent is at least one acid selected from the group consisting of phosphoric acid, acetic acid, and citric acid.

35. A method for filtering a fluid containing a contaminant, including the step of:
(a) moving the fluid through a bed of impregnated zeolite crystals comprising a mixture of first zeolite crystals and second zeolite crystals, wherein the first zeolite crystals have been impregnated with at least one acidic impregnating agent, and the second zeolite crystals have been impregnated with a metal chlorite and at least one impregnating agent selected from the group consisting of calcium chloride, magnesium sulfate, potassium chloride, and potassium hydroxide, wherein chlorine dioxide is produced as a result of chemical reaction of the second zeolite crystals with at least a portion of the at least one acidic impregnating agent and at least a portion of said contaminant is removed from said fluid.

36. The method of claim 35, wherein the metal chlorite is sodium chlorite.

37. The method of claim 35, wherein the second zeolite crystals consist essentially of zeolite crystals impregnated with sodium chlorite and calcium chloride.

38. The method of claim 35, wherein the second zeolite crystals consist essentially of impregnated zeolite crystals comprising 1%–6% sodium chlorite, 0.5%–2% calcium chloride, 4%–8% water, and 84%–94.5% zeolite by weight.

39. The method of claim 35, wherein the fluid is air.

40. The method of claim 35, also including the step of:
(b) after step (a), moving the fluid through a second bed of impregnated zeolite crystals, wherein the impregnated zeolite crystals in the second bed have been impregnated with an impregnating agent selected from the group consisting of potassium hydroxide, sodium sulfite, sodium bisulfite, and ferrous sulfate, wherein at least some of the chlorine dioxide is removed by chemical reaction with the second bed.

41. The method of claim 35, wherein said at least one acidic impregnating agent is at least one acid selected from the group consisting of phosphoric acid, acetic acid, and citric acid.

42. A method for filtering a fluid containing a contaminant, including the steps of:
(a) moving the fluid through a first bed of impregnated zeolite crystals which have been impregnated with a metal chlorite and at least one impregnating agent selected from the group consisting of calcium chloride, magnesium sulfate, potassium chloride, and potassium hydroxide; and
(b) after step (a), moving the fluid through a second bed of impregnated zeolite crystals which have been impregnated with at least one acidic impregnating agent, wherein chlorine dioxide is produced as a result of chemical reaction of at least one substance released from the first bed with at least a portion of said at least one acidic impregnating agent and at least a portion of said contaminant is removed from said fluid.

43. The method of claim 42, wherein the metal chlorite is sodium chlorite.

44. The method of claim 42, wherein the first bed consists essentially of zeolite crystals impregnated with sodium chlorite and calcium chloride.

45. The method of claim 42, wherein the first bed consists essentially of impregnated zeolite crystals comprising 1%–6% sodium chlorite, 0.5%–2% calcium chloride, 4%–8% water, and 84%–94.5% zeolite by weight.

46. The method of claim 42, wherein the fluid is air.

47. The method of claim 42, also including the step of:

(c) after step (b), moving the fluid through a third bed of impregnated zeolite crystals, wherein the impregnated zeolite crystals in the third bed are impregnated with an impregnating agent selected from the group consisting of potassium hydroxide, sodium sulfite, sodium bisulfite, and ferrous sulfate, wherein at least some of the chlorine dioxide is removed by chemical reaction with the third bed.

48. The method of claim 42, wherein said at least one acidic impregnating agent is at least one acid selected from the group consisting of phosphoric acid, acetic acid, and citric acid.

49. A method for producing chlorine dioxide, including the steps of:

(a) providing zeolite crystals which have been impregnated with a metal chlorite and at least one impregnating agent selected from the group consisting of calcium chloride, magnesium sulfate, potassium chloride, and potassium hydroxide; and (b) exposing the zeolite crystals to aqueous acid, thereby producing a mixture comprising said zeolite crystals and said aqueous acid.

50. The method of claim 49, wherein the metal chlorite is sodium chlorite.

51. The method of claim 49, wherein the aqueous acid comprises at least one of acetic acid, phosphoric acid, and citric acid.

52. The method of claim 49, wherein the mixture comprises the aqueous acid in an amount in the range from 0.025% to 0.5% of said mixture.

53. The method of claim 49, wherein step (b) includes the step of immersing the zeolite crystals in the aqueous acid.

54. The method of claim 49, wherein step (b) includes the step of spraying the zeolite crystals with the aqueous acid.

55. The method of claim 49, wherein said at least one impregnating agent is calcium chloride.

56. The method of claim 54, wherein the zeolite crystals comprise 1%–6% sodium chlorite, 0.5%–2% calcium chloride, 4%–8% water, and 84%–94.5% zeolite by weight.

* * * * *